US012304427B2

(12) United States Patent
MacDonald et al.

(10) Patent No.: US 12,304,427 B2
(45) Date of Patent: May 20, 2025

(54) PRESENCE-BASED VEHICLE ACCESS DOOR RELEASE USING DIGITAL KEY LEVERAGING ULTRASONIC SENSING

(71) Applicant: GM GLOBAL TECHNOLOGY OPERATIONS LLC, Detroit, MI (US)

(72) Inventors: Amy A. MacDonald, Northville, MI (US); Keysha Camps, Franklin, MI (US); John D. Cockburn, Tecumseh (CA); Gabriel A. Cruz, Sterling Heights, MI (US); Jason Abraham, Troy, MI (US); Connor A. Tagg, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 251 days.

(21) Appl. No.: 17/988,213

(22) Filed: Nov. 16, 2022

(65) Prior Publication Data
US 2024/0157911 A1 May 16, 2024

(51) Int. Cl.
*B60R 25/31* (2013.01)
*B60R 25/01* (2013.01)
*B60R 25/24* (2013.01)

(52) U.S. Cl.
CPC .............. *B60R 25/31* (2013.01); *B60R 25/01* (2013.01); *B60R 25/24* (2013.01); *B60R 2325/101* (2013.01); *B60R 2325/205* (2013.01)

(58) Field of Classification Search
CPC ......... B60R 25/31; B60R 25/01; B60R 25/24; B60R 2325/101; B60R 2325/205; G07C 9/00; G07C 2009/00
See application file for complete search history.

(56) References Cited

U.S. PATENT DOCUMENTS

| | | | |
|---|---|---|---|
| 7,106,172 B2* | 9/2006 | Neveux | E05B 81/78 340/426.36 |
| 11,662,453 B2* | 5/2023 | Yu | A61B 5/1135 342/175 |
| 2015/0048927 A1* | 2/2015 | Simmons | G07C 9/00309 340/5.61 |
| 2019/0122056 A1* | 4/2019 | Tran | G01H 5/00 |
| 2022/0185170 A1* | 6/2022 | Salter | H05B 47/115 |

\* cited by examiner

*Primary Examiner* — Thomas S McCormack
(74) *Attorney, Agent, or Firm* — Quinn IP Law

(57) ABSTRACT

A method of controlling access into a vehicle interior from a vehicle exterior using an access door includes generating a digital key signal via a mobile device in possession of a vehicle user. The method also includes receiving, via a virtual key control module (VKCM), the digital key signal from the mobile device and communicating a signal indicative of the received digital key signal to a vehicle controller. The method additionally includes detecting a presence of the vehicle user external to the vehicle within a predetermined proximity of the access door via an ultrasonic sensing arrangement. The method also includes communicating, via the ultrasonic sensing arrangement, the detected presence of the vehicle user to the vehicle controller. Furthermore, the method includes commanding, via the vehicle controller, a mechanism to release the access door in response to the received digital key signal and the detected presence of the vehicle user.

12 Claims, 4 Drawing Sheets

PRESENCE-BASED VEHICLE ACCESS DOOR RELEASE USING DIGITAL KEY LEVERAGING ULTRASONIC SENSING

INTRODUCTION

The present disclosure is drawn to a release of a vehicle access door based on presence of a vehicle user established by a combination of a digital key and ultrasonic sensing.

A typical vehicle has at least one side door to provide access for vehicle occupants to the vehicle's interior. Generally, such side doors are either hinged to swing-out relative to the vehicle body or are configured to slide relative thereto. Such a side door typically has a latch mechanism for maintaining the door in a closed state until access into or egress from the vehicle is required. The door latch mechanism is typically actuated by an outside door handle to gain access to the interior of the vehicle and by an interior door handle to permit the occupant to exit the vehicle interior.

Additionally, vehicles frequently have enclosed cargo areas that are positioned either at the front or at the rear end of the vehicle body. The design of such cargo enclosures typically includes a hinged cargo door, such as a deck-lid or a tailgate for security and convenient access. Generally, similar to the side doors, cargo enclosure doors employ latch mechanisms for maintaining the enclosure in a closed state until access thereto is required. In modern vehicles, latch mechanisms for both the side doors and cargo doors are frequently power actuated. Additionally, some vehicles offer door release systems employing various sensors and transmitters to detect a user's intention to gain access into the vehicle.

SUMMARY

A method of controlling access into a vehicle having a vehicle body defining a vehicle interior, a vehicle exterior, an access opening between the interior and the exterior, and an access door configured to selectively cover and uncover at least a portion of the access opening includes generating a digital key signal via a mobile device in possession of a vehicle user. The method also includes receiving, via a virtual key control module (VKCM), the digital key signal from the mobile device and communicating a signal indicative of the received digital key signal to a vehicle controller. The method additionally includes detecting a presence of the vehicle user external to the vehicle within a predetermined proximity of the access door via an ultrasonic sensing arrangement. The method also includes communicating, via the ultrasonic sensing arrangement, the detected presence of the vehicle user to the vehicle controller. Furthermore, the method includes commanding, via the vehicle controller, such as a body control module (BCM), a mechanism configured to selectively fasten the access door to the vehicle body and release the access door therefrom, to release the access door in response to the received digital key signal and the detected presence of the vehicle user.

The mobile device may be a cellular telephone and the digital key signal may be a low-energy Bluetooth received signal strength indicator (BLE RSSI).

The vehicle controller may be in a sleep mode when the vehicle is in a parked state prior to the generation of the digital key signal. The method may additionally include waking up the vehicle controller via the VKCM following receiving of the digital key signal. In such an embodiment, the signal indicative of the received digital key signal communicated by the VKCM to the vehicle controller may be used to wake up the vehicle controller.

The ultrasonic sensing arrangement may be in a sleep mode when the vehicle is in a parked state prior to the generation of the digital key signal. The method may also include communicating, via the VKCM, the signal indicative of the received digital key signal to the ultrasonic sensing arrangement. The method may additionally include triggering, via the ultrasonic sensing arrangement, collection and processing of data from an area external to the vehicle in response to the ultrasonic sensing arrangement being awakened.

The ultrasonic sensing arrangement may include an ultrasonic sensor and an ultrasonic processing module (UPM). In such an embodiment, the method may additionally include collecting, via the ultrasonic sensor, analog data from within the predetermined proximity of the access door and transforming the collected analog data, via the UPM, into digital echo data.

The method may additionally include communicating, via the UPM, the digital echo data to an access control module (ACP), waking up the ACP in response to the detection of the presence of the vehicle user, and transforming, via the ACP, the digital echo data into object data.

The method may also include communicating, via the ACP to the vehicle controller, the object data and a request to release the access door.

The method may additionally include arbitrating the object data and commanding the mechanism to release the access door, via the vehicle controller, in response to the request when the object data corresponds to the vehicle user having been stationary for a predetermined duration of time and the vehicle is in the parked state.

The vehicle body may be arranged relative to a longitudinal centerline. The method may also include determining, via the UPM, the presence of the vehicle user by determining a dynamic trajectory of the vehicle user either along the longitudinal centerline of the vehicle body, from a left side of the longitudinal centerline, or from a right side of the longitudinal centerline.

The object data may correspond to the vehicle user having been stationary when movement of the vehicle user along the determined dynamic trajectory is below a calculated range rate threshold.

A vehicle having the vehicle controller, the ultrasonic sensing arrangement, and the vehicle virtual key control module (VKCM) in communication with the mobile device is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
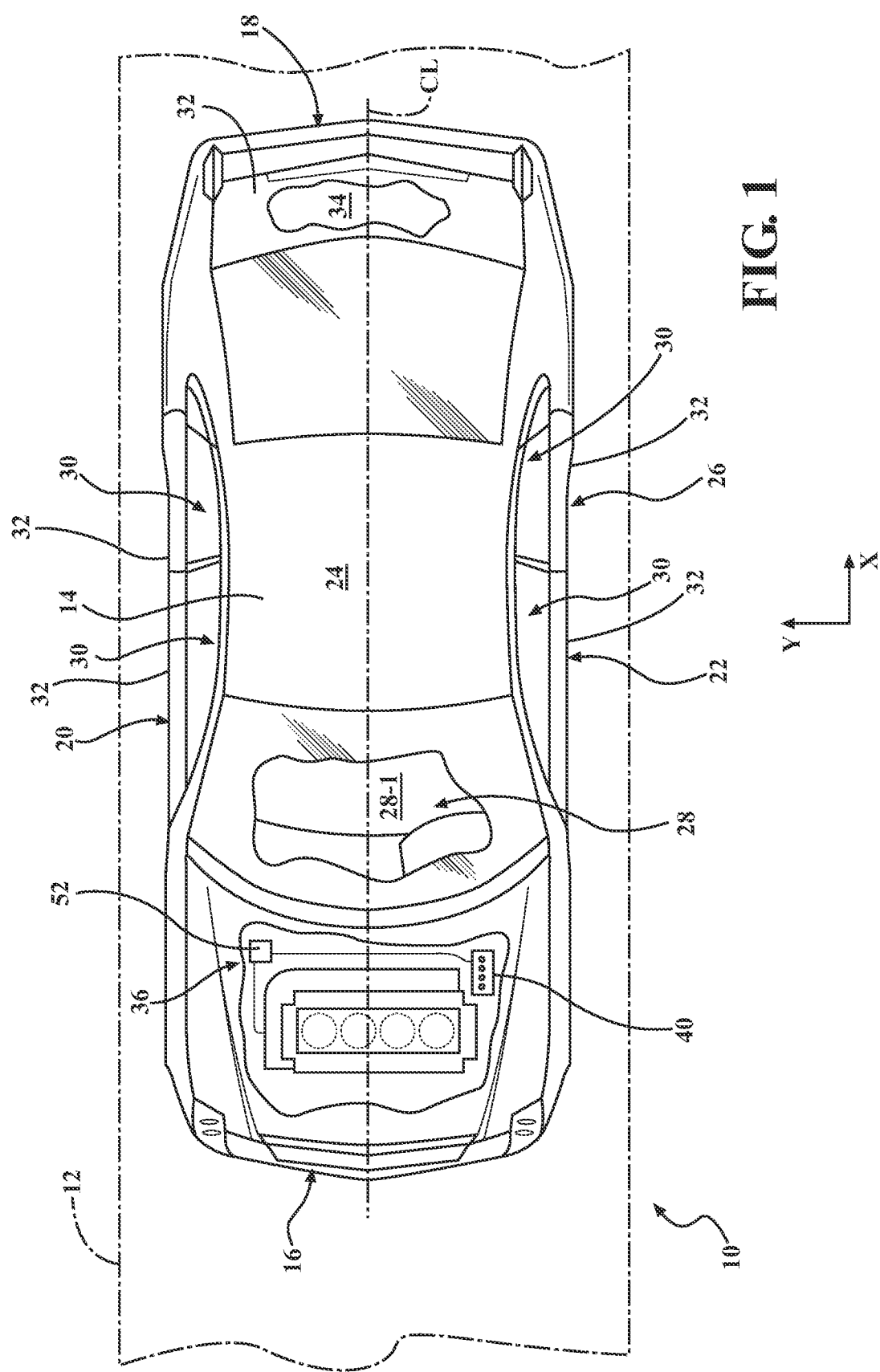
FIG. 1 is a schematic top view of a vehicle having a passenger compartment and a cargo enclosure with respective access doors according to the present disclosure and having a system for controlling access into the vehicle.

Referring to the drawings, wherein like reference numbers refer to like components, FIG. 1 shows a schematic view of a motor vehicle 10 positioned relative to a road surface 12 in an X-Y plane. The vehicle 10 includes a vehicle body 14. As shown, the vehicle body 14 is arranged relative to a longitudinal centerline CL. The vehicle body 14 generally defines six body sides. The six body sides include a first body end or front end 16, an opposing second body end or rear end 18, a first lateral body side or left side 20, a second lateral body side or right side 22, a top body portion 24, which may include a vehicle roof, and an underbody portion (not shown) generally facing the road surface 12. The left side 20 and right side 22 are disposed generally parallel to each other and with respect to the longitudinal centerline CL of the vehicle body 14 and span the distance between the front end 16 and the rear end 18.

The body sides 16, 18, 20, 22, 24, together with the underbody portion define a vehicle exterior 26. The body 14 also defines a vehicle interior 28 that includes a passenger compartment 28-1. The passenger compartment 28-1 is adapted to accommodate vehicle passengers and their belongings. As shown in FIG. 1, the vehicle 10 also includes at least one access opening 30 that is defined by the body 14 and provides access to the vehicle interior 28. As shown, the vehicle body 14 defines five individual access openings 30. The vehicle 10 also includes a number of access doors 32, one door for each of the access openings 30. Accordingly, each access door 32 is configured to selectively cover and uncover at least a portion of the respective access opening 30 in order to control passage between the vehicle exterior 26 and the vehicle interior 28. As shown, four of the access openings are side entries configured to provide access to the passenger compartment 28-1, while the fifth opening provides access into a cargo enclosure 34. A respective access door 32 is provided to selectively cover and uncover at least a portion of the access opening 30 into the cargo enclosure 34.

Figure 2:
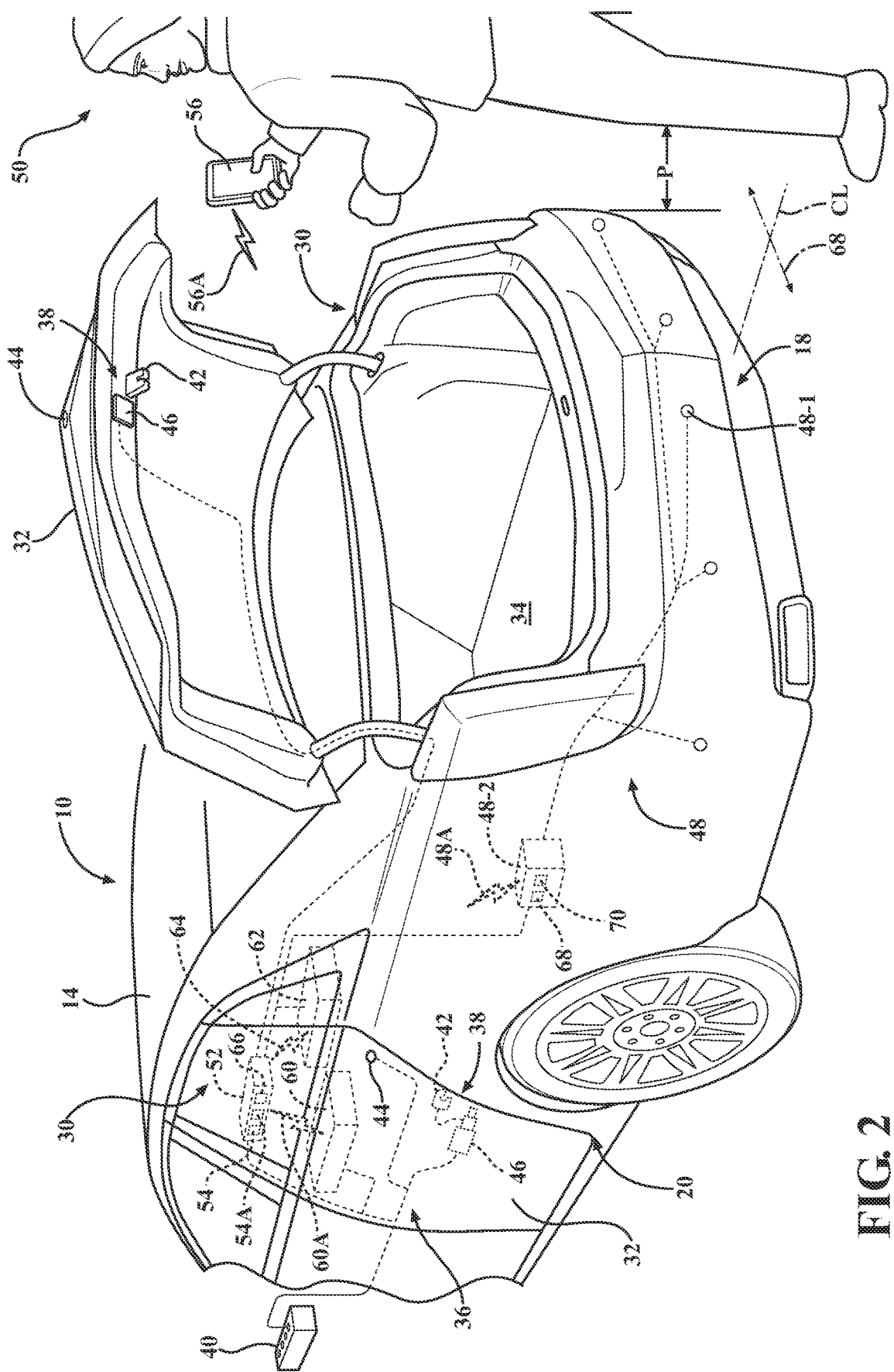
FIG. 2 is a partial perspective rear view of an example vehicle having the system for controlling access thereto, illustrating a three-box sedan body style having a fully-enclosed trunk and a deck lid for covering thereof.

The cargo enclosure 34 may be configured as a separate compartment, such as a fully-enclosed trunk, for instance in a traditional three-box sedan body style, while the respective access door 32 may be configured as a hinged deck-lid, as shown in FIG. 2. The access door 32 may also be configured as a tailgate, shown in FIG. 3, for a fully or partially-enclosed trunk, wherein at least one side of the trunk is open to the passenger compartment 28-1. As shown, the tailgate-type of the access door 32 is hinged at the rear end 18 of the vehicle body 14 for substantially vertical pivotable movement, such as a liftgate. Additionally, the access door 32 may be configured as a tailgate hinged to the rear end 18 of the vehicle body 14 for substantially horizontal pivotable movement, such as a swing-out door (not shown). Although the cargo enclosure 34 is primarily described and shown throughout the Figures as being arranged at the rear end 18 of the vehicle body 14, such a cargo enclosure may also be arranged proximate the front end 16. Such a front-positioned cargo enclosure 34 (not shown) may, for example, be used in a rear-engine or a mid-engine vehicle. The disclosed tailgate is of the type that is frequently used for access to the interiors and storage compartments in vans, station wagons, and sport utility vehicles (SUVs).

Figure 3:
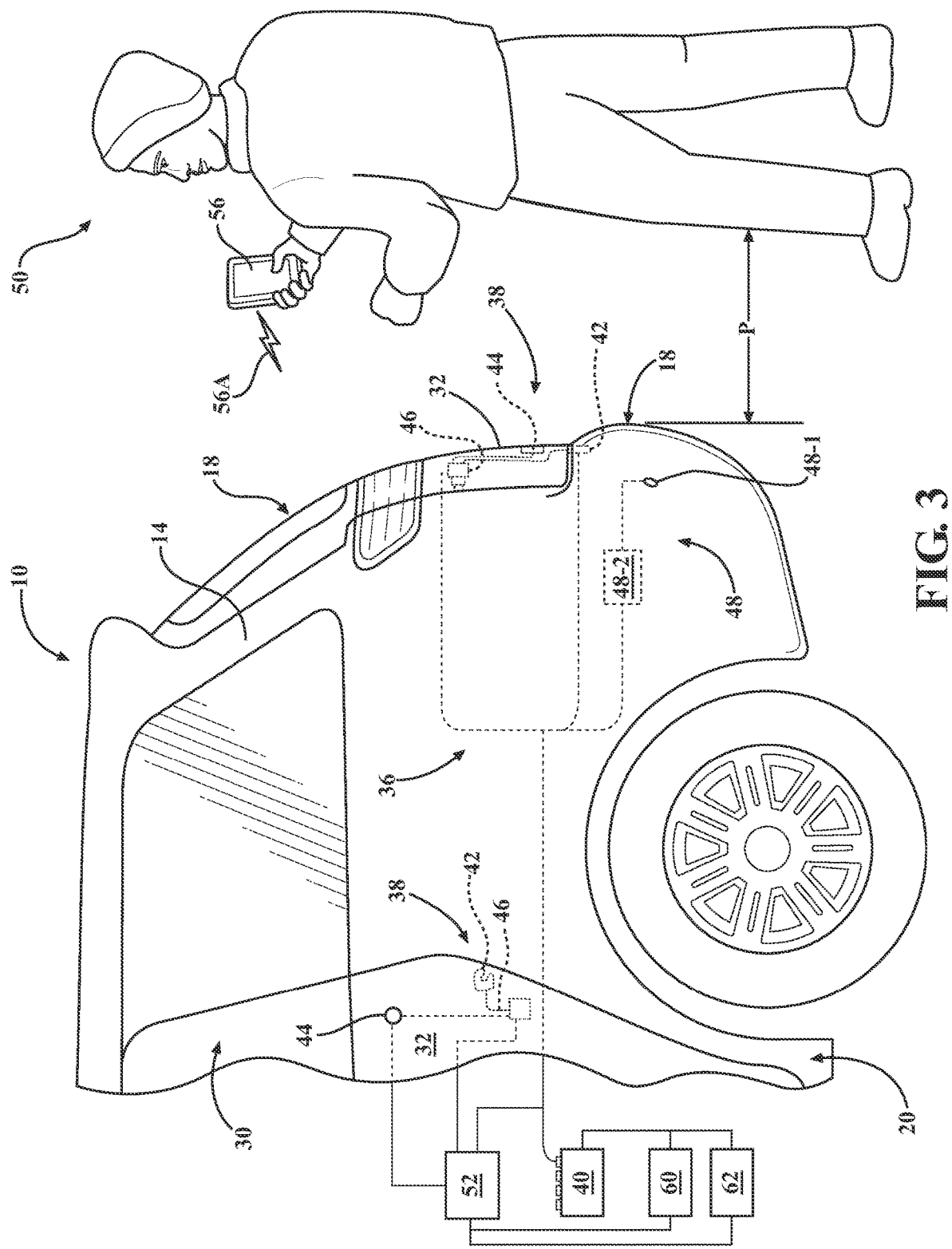
FIG. 3 is a partial rear view of an alternative embodiment of the vehicle having the system for controlling access thereto, illustrating an example of a hatchback body style having a partially-enclosed trunk and a tailgate for covering thereof.

As shown in FIGS. 2 and 3, the vehicle 10 also includes a system 36 for controlling access into the subject vehicle 10. The system 36 includes a mechanism 38 configured to selectively fasten a respective access door 32 to the vehicle body 14 and release the access door therefrom. The system 36 includes an energy storage device 40 (shown in FIGS. 1-3), such as a battery, which may also be used for generating electrical power to operate various vehicle systems, such as powertrain, lighting, and heating, ventilation, and air conditioning (HVAC). As shown in FIGS. 2 and 3, the mechanism 38 also includes a latch 42 for each of the access doors 32. Each latch 42 is configured to selectively fasten the access door 32 to the vehicle body 14 and release the access door therefrom. As shown in FIGS. 2 and 3, the system 36 may also include a number of release switches 44, each such switch in electrical communication with a respective latch 42 and the energy storage device 40. The release switch 44 may be arranged on a respective access door 32 or proximate the subject access door on the exterior 26 of the vehicle body 14. The system 36 may additionally include interior release switches (not shown) for the respective access doors 32.

The system 36 also includes at least one electric motor 46 (shown in FIGS. 2 and 3) in electrical connection with the energy storage device 40. The release switch 44 is configured to activate the electric motor 46 and thereby operate the latch 42. Accordingly, each latch 42 is power operated to facilitate access to the respective access opening 30 via the access door 32 by using the electrical power generated by the energy storage device 40. The release switch 44 may be configured as a pushbutton, a haptic sensor, or another appropriate device conveniently positioned for access by a vehicle's operator or passenger. As shown in FIG. 2, the system 36 additionally includes an ultrasonic sensing arrangement 48 configured to recognize or detect a presence of a vehicle user 50 (shown in FIGS. 2 and 3) external to the vehicle 10 within a predetermined proximity P of a particular access door 32. The ultrasonic sensing arrangement 48 may include one or more ultrasonic sensors 48-1 configured to collect analog data from within the predetermined proximity P of the access door 32. The ultrasonic sensing arrangement 48 may additionally include an ultrasonic processing module (UPM) 48-2 configured to process and transform the collected analog data into digital echo data.

The system 36 also includes an electronic vehicle controller 52 (shown in FIGS. 1-3, such a central processing unit (CPU) for regulating various functions on the vehicle 10 or be configured as a body control module (BCM) specifically configured to control various vehicle systems such as the HVAC, lighting, and vehicle access and security via operation of the mechanism 38. The vehicle controller 52 includes a processor and tangible, non-transitory memory, which includes instructions for operation of the system 36 programmed therein. The memory of the vehicle controller 52 may be an appropriate recordable medium that participates in providing computer-readable data or process instructions. Such a recordable medium may take many forms, including but not limited to non-volatile media and volatile media. Non-volatile media for the vehicle controller 52 may include, for example, optical or magnetic disks and other persistent memory. Volatile media may include, for example, dynamic random-access memory (DRAM), which may constitute a main memory. Such instructions may be transmitted by one or more transmission medium, including coaxial cables, copper wire and fiber optics, including the wires that comprise a system bus coupled to a processor of a computer, or via a wireless connection. Memory of the vehicle controller 52 may also include a flexible disk, hard disk, magnetic tape, another magnetic medium, a CD-ROM, DVD, another optical medium, etc.

The vehicle controller 52 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by vehicle systems, such as powertrain, lighting, and heating, ventilation, and HVAC or accessible thereby may be stored in the memory and automatically executed to provide the required functionality. The vehicle controller 52 is also configured to monitor operation of the system 36 and process data, such as via the subject algorithms, gathered by various vehicle sensors. The vehicle controller 52 is specifically programmed with an algorithm 54 for controlling access into the vehicle 10 during operation of the system 36.

A mobile device 56 (shown in FIGS. 2 and 3), such as a cellular telephone or another portable communication device, designed to be in possession of the vehicle user 50 and configured to generate a digital key signal 56A is employed by the system 36 for controlling access into the vehicle 10. Accordingly, for the purposes of the present disclosure, the mobile device 56 is also part of the system 36. Specifically, the digital key signal 56A generated by the mobile device 56 may be a low-energy Bluetooth received signal strength indicator (BLE RSSI). The system 36 also includes a vehicle virtual key control module (VKCM) 60 (shown in FIG. 2) in operative communication with a vehicle controller 52, the ultrasonic sensing arrangement 48, and the mobile device 56. The VKCM 60 is configured to receive the digital key signal 56A from the mobile device 56 when the device is in possession of the vehicle user 50. In response to receiving the digital key signal 56A, the VKCM is configured to send out a trigger signal 60A. The vehicle controller 52 is specifically programmed to receive the signal 60A from the VKCM 60 indicative of the digital key signal 56A received thereby.

The vehicle controller 52 may initially be in a sleep mode when the vehicle 10 is in a parked, e.g., key-off, state, prior to the generation of the digital key signal. The VKCM 60 may wake up the vehicle controller 52 via the signal 60A in response to the received digital key signal 56A. The ultrasonic sensing arrangement 48 may also initially be in a sleep mode when the vehicle 10 is in the parked or key-off state prior to the generation of the digital key signal. The VKCM 60 may similarly wake up the ultrasonic sensing arrangement 48 in response to the received digital key signal 56A via the signal 60A. In response to being awakened, the ultrasonic sensing arrangement 48 may trigger collection of data from an area external to the vehicle 10 via the ultrasonic sensor(s) 48-1 and processing of the data via the UPM 48-2. The vehicle controller 52 is also programmed to receive a signal 48A from the ultrasonic sensing arrangement 48 corresponding to the detected presence of the vehicle user 50 within the predetermined proximity P of the access door 32. The vehicle controller 52 is further programmed to command the mechanism 38, by executing the algorithm 54, to release the access door 32 in response to the received digital key signal 56A and the detected presence of the vehicle user 50.

The system 36 may additionally include an access control module (ACP) 62 (shown in FIG. 2) in communication with the UPM 48-2 and with the vehicle controller 52. The UPM 48-2 may be additionally configured to communicate the digital echo data to the ACP 62. In response to the detection of the presence of the vehicle user 50, the ACP 62 may be configured to wake up to process and transform the digital echo data into object data. The ACP 62 may be further configured to communicate to the vehicle controller 52 the object data and a request 64 to release the access door 32. The vehicle controller 52 may be configured to arbitrate the object data received from the ACP 62. The vehicle controller 52 may be further configured to command the mechanism 38 to release the access door 32, such as by issuing a control signal 54A, in response to the request 64 when the object data corresponds to the vehicle user having been stationary for a predetermined duration 66 of time (shown in FIG. 2) and the vehicle 10 remains in the parked state. The data collected via the ultrasonic sensor(s) 48-1 may be sampled every 40 milliseconds.

The UPM 48-2 may be additionally configured to determine the presence of the vehicle user by determining a dynamic trajectory 68 (shown in FIG. 2) of the vehicle user in an X-Y plane, either along the longitudinal centerline CL of the vehicle body 14, from a left side of the longitudinal centerline, or from a right side of the longitudinal centerline. The object data may correspond to the vehicle user 50 having been stationary when movement of the vehicle user along the determined dynamic trajectory 68 is below a calculated range rate threshold 70. The rate of vehicle user 50 movement may be calculated using data acquired by the ultrasonic sensor 48-1 and compared to the range rate threshold 70 via the UPM 48-2.

Figure 4:
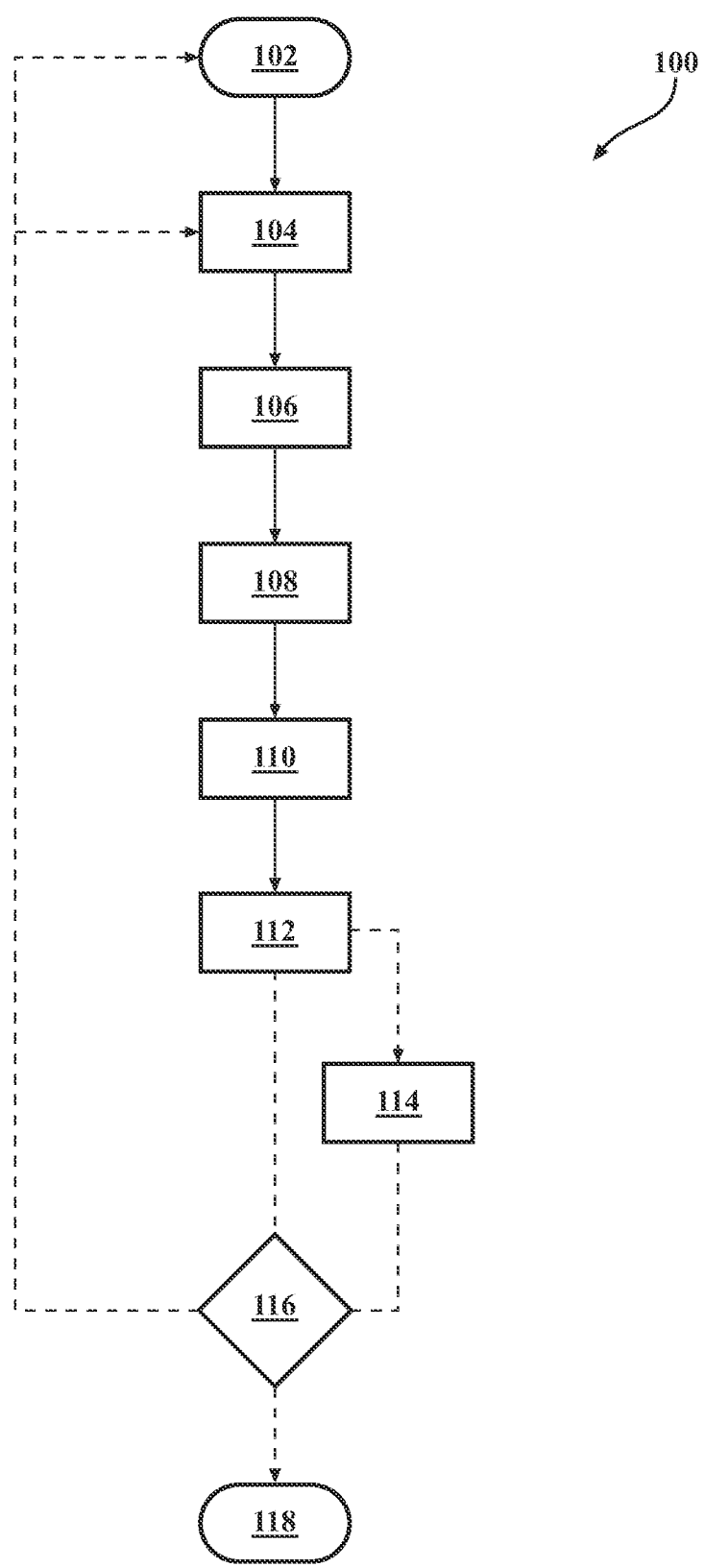
FIG. 4 illustrates, in flow chart format, a method of controlling access into the vehicle shown in FIGS. 1-3, according to the disclosure.

FIG. 4 depicts a method 100 of controlling access, via the system 36, into the vehicle 10 having access doors 32 for the access openings 30 in the vehicle body 14, as described above with respect to FIGS. 1-3. The method commences in frame 102 with a vehicle user 50 approaching the parked vehicle 10 in possession of the mobile device 56 and seeking access to the interior of the vehicle, such as the passenger compartment 28-1 or the cargo enclosure 34 through a respective access door 32. As noted above, the mobile device 56 may be a cellular telephone using a low-energy Bluetooth received signal strength indicator (BLE RSSI) for the digital key signal 56A. The vehicle user 50 may approach the vehicle 10 from the rear end 18, the left side 20, or the right side 22. Following frame 102, the method advances to frame 104.

In frame 104 the method includes generating the digital key signal 56A via the mobile device 56. After frame 104, the method moves on to frame 106. According to the disclosure, in frame 106, the method includes receiving, via the vehicle virtual key control module (VKCM) 60, the digital key signal 56A communicated by the mobile device 56. After frame 106, the method proceeds to frame 108. In frame 108, the method includes communicating, via the VKCM 60, the signal 60A indicative of the detected the received digital key signal 56A to the vehicle controller 52. Prior to receiving the signal 60A from the VKCM 60, the vehicle controller 52 may be in a sleep mode and the VKCM signal 60A may have the function of waking up the vehicle controller. Following frame 108, the method advances to frame 110.

In frame 110, the method includes detecting the presence of the vehicle user 50 external to the vehicle 10 within the predetermined proximity P of the access door 32 via the ultrasonic sensing arrangement 48. The ultrasonic sensing arrangement 48 may be in a sleep mode when the vehicle is in the parked state prior to receiving the VKCM signal 60A and be woken up via the VKCM signal, thus being triggered to collect and process data from within the predetermined proximity P of the access door 32. In frame 110, the method may additionally include collecting, via the ultrasonic sensor 48-1, analog data from within the predetermined proximity P of the access door 32 and processing and transforming the collected analog data, via the UPM 48-2, into digital echo data. After detecting the presence of the vehicle user 50, the method advances to frame 112.

In frame 112, the method includes communicating, via the ultrasonic sensing arrangement 48, the signal 48A corresponding to the detected presence of the vehicle user to the vehicle controller 52. After frame 112, the method may proceed to frame 114 and then to frame 116, or directly to frame 116. In frame 114, the digital echo data may be communicated by the UPM 48-2 to the access control module (ACP) 62, thereby waking up the ACP in response to the detection of the presence of the vehicle user 50, and processing and transforming, via the ACP, the digital echo data into object data. In frame 114, the method may also include communicating to the vehicle controller 52, by the ACP 62, the object data and the request 64 to release the access door 32.

In frame 116, the method includes commanding, via the vehicle controller 52, the mechanism 38 to release the subject access door 32 in response to the received digital key signal 56A and the detected presence of the vehicle user 50. In frame 116, the method may also include arbitrating the object data and commanding the mechanism 38 to release the subject access door 32, via the vehicle controller 52, in response to the request 64. Specifically, the vehicle controller 52 may command the mechanism 38 to release the access door 32 when the object data corresponds to the vehicle user 50 having been stationary for a predetermined duration 66 of time and while the vehicle 10 is in the parked state.

The subject presence of the vehicle user 50 may be established by determining the vehicle user's dynamic trajectory 68 either along the longitudinal centerline CL of the vehicle body 14, from a left side of the longitudinal centerline, or from a right side of the longitudinal centerline. As described above with respect to FIGS. 1-3, the object data corresponds to the vehicle user 50 remaining stationary when the vehicle user's movement along the determined dynamic trajectory is below a calculated range rate threshold 70. If in frame 116 the vehicle user 50 is determined to not be within the proximity P or stationary relative to the vehicle 10, the method may return to frame 104. Alternatively, following releasing the subject access door 32 in frame 116, the method may return to frame 102 or conclude in frame 118.

Overall, the system 36 and method 102 are intended to provide capability for a vehicle to detect a presence of the vehicle's user using existing vehicle sensing arrangement and control structure interfacing with a mobile device in user's possession to permit vehicle access to the user. Specifically, the described system 36 and method 102 facilitate a hands-free access into the vehicle using vehicle ultrasonic sensors generally employed for obstacle detection. Additionally, the system 36 and method 102 permit such access without requiring dedicated verbal or non-verbal user-vehicle interaction. Such an access system and method may be employed to permit release of select vehicle doors using detected position, proximity, and movement of the vehicle user relative to a particular vehicle access point and corresponding sensors. Furthermore, the described system and method permit a more convenient hands-free vehicle access as compared to some existing systems requiring specific user gestures in predetermined locations near the subject access doors.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of controlling access into a vehicle having a vehicle body arranged relative to a longitudinal centerline and defining a vehicle interior, a vehicle exterior, an access opening between the interior and the exterior, and an access door configured to selectively cover and uncover at least a portion of the access opening, the method comprising:

generating a digital key signal via a mobile device in possession of a vehicle user;

receiving, via a vehicle virtual key control module (VKCM), the digital key signal from the mobile device;

communicating, via the VKCM, a signal indicative of the received digital key signal to a vehicle controller;

detecting a presence of the vehicle user external to the vehicle within a predetermined proximity of the access door via an ultrasonic sensing arrangement having an ultrasonic processing module (UPM);

determining, via the UPM, the presence of the vehicle user by determining a dynamic trajectory of the vehicle user either along the longitudinal centerline of the vehicle body, from a left side of the longitudinal centerline, or from a right side of the longitudinal centerline;

communicating, via the ultrasonic sensing arrangement, a signal corresponding to the detected and determined presence of the vehicle user to the vehicle controller;

commanding, via the vehicle controller, a mechanism configured to selectively fasten the access door to the vehicle body and release the access door therefrom, to release the access door in response to the received digital key signal and the detected and determined presence of the vehicle user;

wherein:
the vehicle controller is in a sleep mode when the vehicle is in a parked state prior to generation of the digital key signal, and wherein communicating, via the VKCM, the signal indicative of the received digital key signal to the vehicle controller includes waking up the vehicle controller thereby; and the ultrasonic sensing arrangement includes an ultrasonic sensor;

collecting, via the ultrasonic sensor, analog data from within the predetermined proximity of the access door and transforming the collected analog data, via the UPM, into digital echo data;

communicating, via the UPM, the digital echo data to an access control module (ACP) waking up the ACP in response to the detection of the presence of the vehicle user, and transforming, via the ACP, the digital echo data into object data;

communicating, via the ACP to the vehicle controller, the object data and a request to release the access door; and arbitrating the object data and commanding the mechanism to release the access door, via the vehicle controller, in response to the request when the object data corresponds to the vehicle user having been stationary for a predetermined duration of time and the vehicle is in the parked state, wherein the object data corresponds to the vehicle user having been stationary when movement of the vehicle user along the determined dynamic trajectory is below a calculated range rate threshold.

2. The method according to claim 1, wherein the mobile device is a cellular telephone and the digital key signal is a low-energy Bluetooth received signal strength indicator (BLE RSSI).

3. The method according to claim 1, wherein the ultrasonic sensing arrangement is in a sleep mode when the vehicle is in a parked state prior to generation of the digital key signal, further comprising communicating, via the VKCM, the signal indicative of the received digital key signal to the ultrasonic sensing arrangement and triggering, via the ultrasonic sensing arrangement, collection and processing of data from an area external to the vehicle in response to the ultrasonic sensing arrangement being awakened.

4. A system for controlling access into a vehicle having a vehicle body arranged relative to a longitudinal centerline and defining a vehicle interior, a vehicle exterior, an access opening between the interior and the exterior, and an access door configured to selectively cover and uncover at least a portion of the access opening, the system comprising:

a mechanism configured to selectively fasten the access door to the vehicle body and release the access door therefrom;

an ultrasonic sensing arrangement configured to detect a presence of a vehicle user external to the vehicle within a predetermined proximity of the access door and having an ultrasonic processing module (UPM), wherein the UPM is additionally configured to determine the presence of the vehicle user by determining a dynamic trajectory of the vehicle user either along the longitudinal centerline of the vehicle body, from a left side of the longitudinal centerline, or from a right side of the longitudinal centerline;

a vehicle controller configured to control operation of the mechanism;

an access control module (ACP) in communication with the UPM and with the vehicle controller;

a mobile device configured to be in possession of a vehicle user and generate a digital key signal; and a vehicle virtual key control module (VKCM) in operative communication with a vehicle controller, the ultrasonic sensing arrangement, and the mobile device and configured to receive the digital key signal from the mobile device in possession of the vehicle user;

wherein the vehicle controller is programmed with an algorithm, and configured to execute the algorithm to:
receive a signal from the VKCM indicative of the received digital key signal;

receive a signal from the ultrasonic sensing arrangement corresponding to the detected presence of the vehicle user within the predetermined proximity of the access door; and command the mechanism to release the access door in response to the received digital key signal and the detected and determined presence of the vehicle user;

wherein:
the vehicle controller is in a sleep mode when the vehicle is in a parked state prior to generation of the digital key signal;

the signal from the VKCM indicative of the received digital key signal wakes up the vehicle controller;

the ultrasonic sensing arrangement includes an ultrasonic sensor configured to collect analog data from within the predetermined proximity of the access door and the ultrasonic processing module (UPM) is configured to transform the collected analog data into digital echo data;

the UPM is additionally configured to communicate the digital echo data to the ACP;

the ACP is configured to wake up in response to the detection of the presence of the vehicle user and transform the digital echo data into object data;

the ACP is configured to communicate to the vehicle controller the object data and a request to release the access door;

the vehicle controller is configured to arbitrate the object data and command the mechanism to release the access door in response to the request when the object data corresponds to the vehicle user having been stationary for a predetermined duration of time and the vehicle is in the parked state; and the object data corresponds to the vehicle user having been stationary when movement of the vehicle user along the determined dynamic trajectory is below a calculated range rate threshold.

5. The system according to claim 4, wherein the mobile device is a cellular telephone and the digital key signal is a low-energy Bluetooth received signal strength indicator (BLE RSSI).

6. The system according to claim 4, wherein the ultrasonic sensing arrangement is in a sleep mode when the vehicle is in a parked state prior to generation of the digital key signal, and wherein the signal from the VKCM indicative of the received digital key signal wakes up the ultrasonic sensing arrangement and the ultrasonic sensing arrangement triggers collection and processing of data from an area external to the vehicle in response to being awakened.

7. The method according to claim 1, wherein a rate of vehicle user movement is calculated using data acquired by the ultrasonic sensor and compared to the range rate threshold via the UPM.

8. The method according to claim 1, wherein the method commences with the vehicle user approaching the vehicle in the parked state.

9. The method according to claim 1, wherein the method resets when it is determined that the vehicle user ceases to be within the predetermined proximity or stationary relative to the vehicle.

10. The method according to claim 1, wherein the access door is configured to selectively cover and uncover at least a portion of the access opening into a cargo enclosure.

11. The system according to claim 4, wherein a rate of vehicle user movement is calculated using data acquired by the ultrasonic sensor and compared to the range rate threshold via the UPM.

12. The system according to claim 4, wherein the access door is configured to selectively cover and uncover at least a portion of the access opening into a cargo enclosure.

* * * * *